(12) United States Patent
Kozaki

(10) Patent No.: US 8,509,672 B2
(45) Date of Patent: Aug. 13, 2013

(54) SHEET TRANSPORT APPARATUS

(75) Inventor: Daisuke Kozaki, Aichi-ken (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 13/426,915

(22) Filed: Mar. 22, 2012

(65) Prior Publication Data

US 2012/0256370 A1 Oct. 11, 2012

(30) Foreign Application Priority Data

Apr. 8, 2011 (JP) .................................. 2011-086226

(51) Int. Cl.
*G03G 15/00* (2006.01)
(52) U.S. Cl.
CPC .................................... *G03G 15/602* (2013.01)
USPC ......................................... 399/367; 271/264

(58) Field of Classification Search
CPC ...................................................... G03G 15/602
USPC ................ 399/367, 377, 380; 271/3.14, 264
See application file for complete search history.

(56) References Cited

U.S. PATENT DOCUMENTS

| 6,640,083 | B2 * | 10/2003 | Conard-White et al. ...... 399/377 |
| 7,697,174 | B2 * | 4/2010 | Sakakibara et al. .......... 358/474 |
| 8,373,911 | B2 * | 2/2013 | Iwata et al. .................... 358/474 |
| 2002/0056957 | A1 * | 5/2002 | Sekine .......................... 271/3.14 |
| 2012/0155941 | A1 * | 6/2012 | Kozaki et al. ................. 399/367 |

FOREIGN PATENT DOCUMENTS

| JP | 2003-072191 | 3/2003 |
| JP | 2007-286307 | 11/2007 |

* cited by examiner

*Primary Examiner* — Kaitlin Joerger
(74) *Attorney, Agent, or Firm* — Banner & Witcoff, Ltd.

(57) ABSTRACT

A sheet transport apparatus including two or more covers is described. The two or more covers are disposed relative to a sheet transport path. In one example, the two covers include two stacked covers that are movable relative to each other. In another example, the two covers include two side-by-side covers in which one pivots, permitting movement of the other side-by-side cover.

20 Claims, 11 Drawing Sheets

SHEET TRANSPORT APPARATUS

CROSS-REFERENCE TO RELATED APPLICATION

This application claims priority from Japanese Patent Application No. 2011-086226, filed on Apr. 8, 2011, the entire subject matter of which is incorporated herein by reference.

BACKGROUND

1. Technical Field

Aspect of the present invention relate to a sheet transport apparatus.

2. Description of the Related Art

A known printer, facsimile, scanner, and multifunction device includes a sheet transport mechanism that transports a sheet along a predetermined transport path. Such an apparatus reads an image of a sheet or forms an image on a sheet while transporting the sheet along the transport path.

This example of a facsimile apparatus describes a sheet transport apparatus including such a transport mechanism. The facsimile apparatus includes a transparent plate portion that is made of a transparent plastic, such as an acrylic resin. The transparent plate portion is removably attached to a surface of the apparatus, so that the appearance of the apparatus can be customized.

A user can place a decoration such as patterned paper between the transparent plate portion and a surface of the facsimile apparatus. The pattern of the decoration, which is visible through the transparent plate portion, enhances the appearance of the facsimile apparatus. With the described facsimile apparatus, a user can change the pattern by removing the screws and changing the decoration placed between the transparent plate portion and the surface of the apparatus, thereby customizing the appearance of the apparatus.

However, in the case of the described facsimile apparatus, the user has to remove the screws from the four corners of the transparent plate portion to remove the transparent plate portion from the surface of the apparatus. Therefore, the user has to perform a complex operation of removing and fastening the screws in order to remove and reattach the transparent plate portion.

Against such a background, it is worth considering to simplify a structure for attaching and removing a cover member, such as the transparent plate portion. A simplified structure for a cover member would allow a user to attach the cover member to the surface of the apparatus with an easy operation. In this case, however, the cover member may come off the surface of the apparatus if the user unintentionally contacts the cover member when the cover member is not to be removed (for example, during a normal use of the apparatus). In such a case, the user would need to reattach the cover member to the surface of the apparatus.

SUMMARY

Illustrative aspects of the invention may provide a sheet transport apparatus that allows a cover (that may hold a decorative sheet) to be removably attached to a surface of the apparatus by using a structure that is simple and that prevents unintentional removal of the cover.

Aspects of the present invention provide a sheet transport apparatus including two or move covers disposed relative to a sheet transport path. In one example, the two covers include two stacked covers that are movable relative to each other. In another example, the two covers include two side-by-side covers in which one pivots, permitting movement of the other side-by-side cover. In a third example, the stacked covers and the side-by-side covers are used together in relation to the sheet transport path.

DETAILED DESCRIPTION

Hereinafter, an embodiment of the present invention will be described.

An illustrative embodiment will be described in detail with reference to the accompanying drawings. A sheet transport apparatus according to illustrative aspects of invention applies to a sheet transport unit 60 in multifunction device 1 as shown in the figures.

In the following description, in order to clearly describe the positional relationship of parts of the multifunction device 1, the directions of up, down, left, right, front, and rear indicated in the figures will be used.

First, the overall structure of the multifunction device 1 according to the present embodiment will be described with reference to the drawings.

Figure 1:
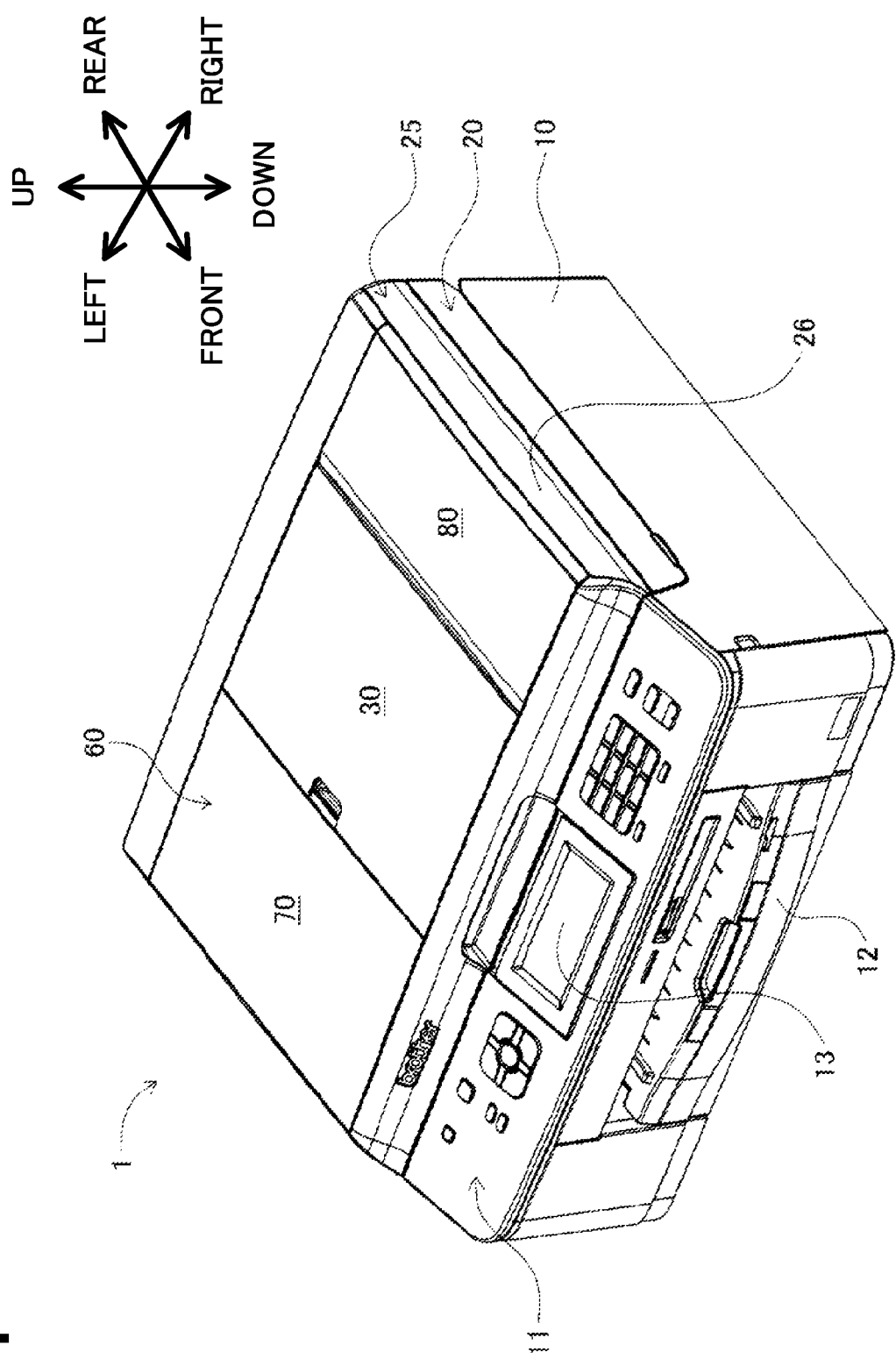
FIG. 1 is an external perspective view of a multifunction device.
Figure 2:
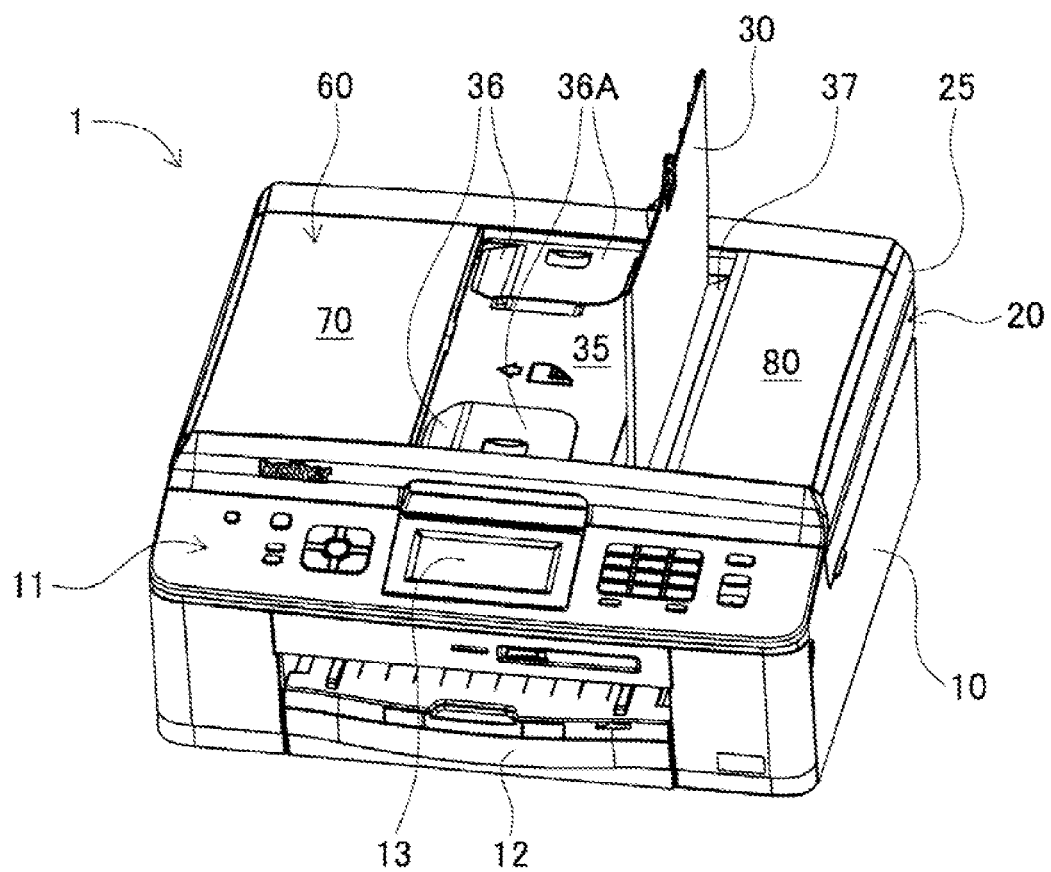
FIG. 2 is an external view of the multifunction device when a cover tray is rotated.

As illustrated in FIG. 1, the multifunction device 1 includes a main housing 10 and a sheet cover 25. The main housing 10 contains various components for carrying out the functions of the multifunction device 1 (such as a scanner function, a facsimile function, and a printer function).

The main housing 10 has an operation panel 11 and a liquid crystal display 13 on the upper front side thereof. The operation panel 11 has operation keys. The liquid crystal display 13 displays various information. The operation panel 11 is used to input instructions to the multifunction device 1. A sheet feed cassette 12 is removably attached into the front side of the main housing 10. The sheet feed cassette 12 contains a stack of sheets, which are recording media.

As illustrated in FIGS. 1 to 4, the main housing 10 has a scanner unit 20 on the upper side thereof. The scanner unit 20 includes a contact glass 21, an image sensor 22, a slide shaft, and a motor. The contact glass 21 functions as a document placing table (see FIG. 4). The contact glass 21, which is a so-called "platen glass", has a rectangular shape that is slightly larger than an A4 sheet, the long side of which extends in the left-right direction of the main housing 10.

The image sensor 22, which is a so-called contact image sensor (CIS), reads an image of a document sheet on the contact glass 21. The image sensor 22 has a readable range having a length in the main scanning direction (i.e., the front-rear direction of the main housing 10) that corresponds to the length of a short side of an A4 sheet. The image sensor 22 is supported so as to be slidable within a certain range (corresponding to the length of an A4 sheet) along a slide shaft that extends in the left-right direction of the main housing 10. The multifunction device 1 reads an image of a document sheet placed on the contact glass 21 while sliding the image sensor 22 along the slide shaft by using a motor controlled by a control unit.

The control unit includes a CPU, a ROM, and a RAM, and serves as a main controller of the multifunction device 1. The control unit is connected to the operation panel 11. Thus, the control unit is capable of performing an operation required by a user on the basis of an input by the user through the operation panel 11. Moreover, the control unit is capable of displaying various information on the liquid crystal display 13 on the basis of a calculation result or an input by a user through the operation panel 11.

A facsimile unit faxes an image of a document sheet read by the scanner unit 20 to a recipient designated by a user through a network. The facsimile unit is also capable of receiving data (facsimile data) through the network. The control unit controls an image forming unit to print the received facsimile data on a sheet contained in the sheet feed cassette 12.

An image forming unit prints input image data on a sheet contained in the sheet feed cassette 12 under the control by the control unit. A copy function of the multifunction device 1 is carried out by controlling the image forming unit on the basis of image data read by the scanner unit 20. A printer function of the multifunction device 1 is carried out by controlling the image forming unit on the basis of print data that is input through a network.

The sheet cover 25 is openable and closable around the back end of the upper surface of the main housing 10. When the sheet cover 25 is closed, the sheet cover 25 covers the upper surface of the main housing 10 (i.e., the contact glass 21) (see FIG. 4). Therefore, when the sheet cover 25 is closed, the sheet cover 25 is capable of fixing a document sheet that is set on the contact glass 21 in place.

As illustrated in FIGS. 1 to 4 and other figures, the sheet cover 25 includes a cover housing 26 including a second side-by-side cover 30, a sheet guide surface 35, a unit body 40, and a first stacked cover 45. The sheet transport unit 60 (a so-called auto document feeder (ADF)) is disposed on the left side of the sheet cover 25.

As illustrated in FIG. 1, the second side-by-side cover 30 is disposed in the middle of the upper surface of the sheet cover 25. The second side-by-side cover 30 is pivotable about an axis of a tray shaft 31 disposed at an end (the right end) of the second side-by-side cover 30 (see FIGS. 2 to 4). It is appreciated that tray shaft 31 may be replaced with projections from or extending into second side-by-side cover 30 such that it is pivotable with respect to scanner 20. As illustrated in FIG. 1, when the second side-by-side cover 30 is in a closed state (hereinafter, the position of the second side-by-side cover 30 in this state will be referred to as a closed position), the second side-by-side cover 30 forms the upper surface of the sheet cover 25 and is an almost the same plane with a second stacked cover 70 and a first side-by-side cover 80, which will be described below.

A surface of the second side-by-side cover 30 that forms the outer surface of the sheet cover 25 when the second side-by-side cover 30 is at the closed position will be referred to as a "first surface" of the second side-by-side cover 30, and a surface opposite to the first surface (inner surface of the second side-by-side cover 30 when the second side-by-side cover 30 is at the closed position) will be referred to as a "second surface" of the second side-by-side cover 30.

Figure 3:
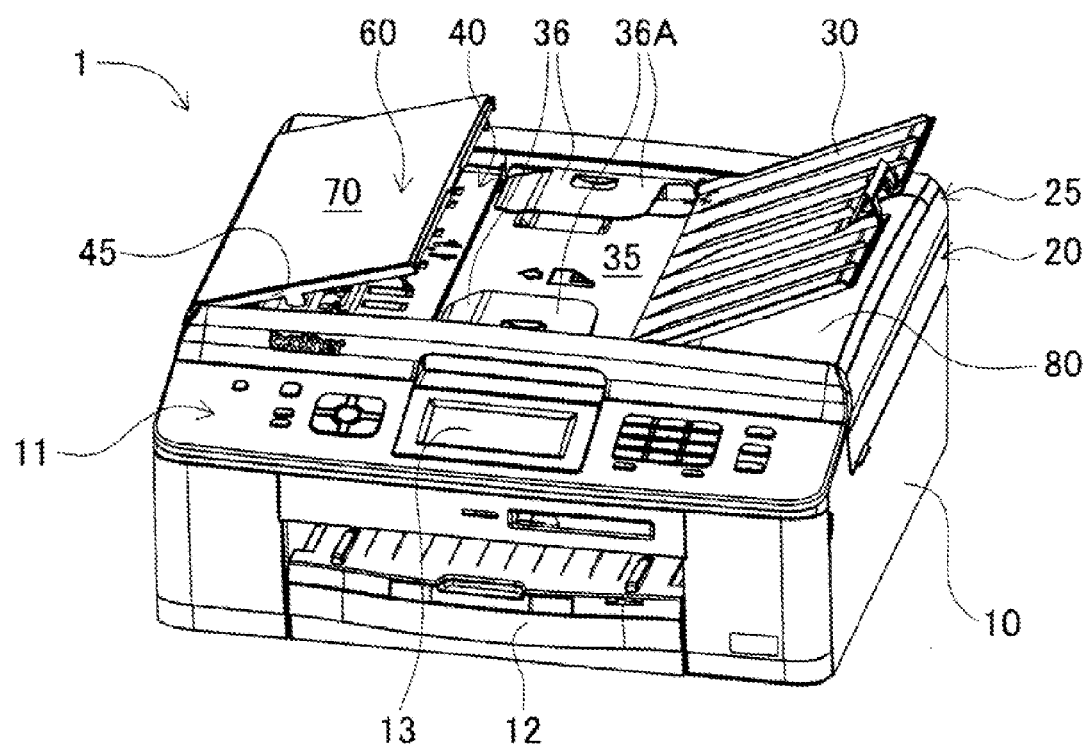
FIG. 3 is an external view of the multifunction device when a first stacked cover is open and the cover tray is rotated to a use position.
Figure 4:
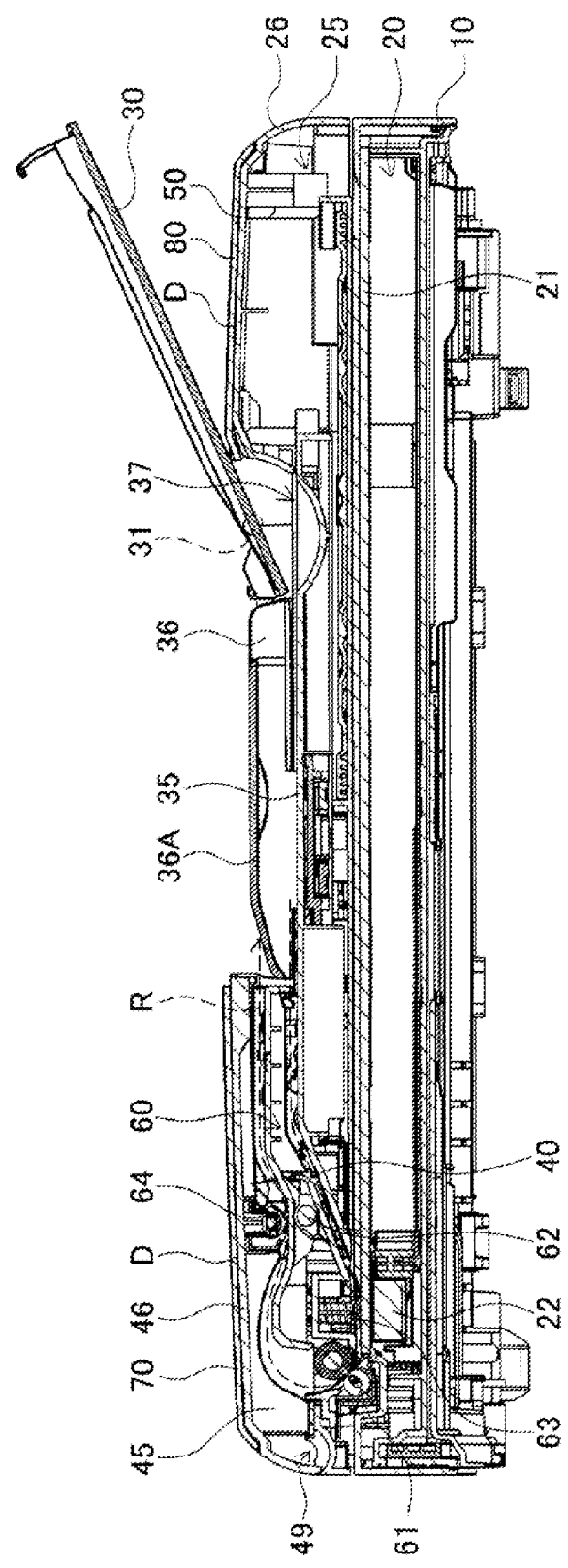
FIG. 4 is a sectional view of a sheet cover.

When the second side-by-side cover 30 is rotated by a predetermined amount, the second side-by-side cover 30 is positioned at a predetermined use position (see FIGS. 3 and 4). When the second side-by-side cover 30 is at the use position, the second surface of the second side-by-side cover 30 faces up and is inclined downward toward the sheet transport unit 60 (see FIGS. 2 and 3). Therefore, when the second side-by-side cover 30 is at the use position, a stack of document sheets can be placed on the second surface of the second side-by-side cover 30. That is, when the second side-by-side cover 30 is at the use position, the second side-by-side cover 30 functions as a feed tray.

When the second side-by-side cover 30 is at the closed position, the sheet guide surface 35 and a pair of sheet guide members 36 are positioned below the second side-by-side cover 30 (see FIGS. 1 to 4). Therefore, when the second side-by-side cover 30 is rotated by a predetermined amount to the predetermined use position (see FIGS. 3 and 4), the sheet guide members 36 and the sheet guide surface 35 are exposed to the outside.

The sheet guide surface 35 is a flat surface formed along an end portion of a sheet transport path R (see FIG. 4) that is formed in an area of the unit body 40 corresponding to a lower portion of the sheet transport unit 60. The sheet guide surface 35 is continuous with an edge of the second side-by-side cover 30 when the second side-by-side cover 30 is at the use position. Thus, the sheet guide surface 35 guides a document sheet placed on the second surface of the second side-by-side cover 30 to the sheet transport path R in the sheet transport unit 60.

The sheet guide members 36 are slidable over the sheet guide surface 35 in the front-rear direction. The sheet guide members 36 are configured to be slidable in directions opposite to each other by using a link mechanism (not shown). Therefore, by operating only one of the sheet guide members, the sheet guide members 36 can be slid in directions in which the sheet guide members 36 are made closer to or separated from each other, whereby the distance between the sheet guide members 36 can be changed. Thus, in the multifunction device 1, a document sheet can be aligned with the sheet guide members 36 by operating the sheet guide members 36, whereby the document sheet is prevented from being inclined with respect to the transport direction.

The sheet guide members 36 each include a partition plate 36A. The partition plate 36A is disposed above the sheet guide surface 35 with a certain gap therebetween.

As illustrated in FIGS. 3 and 4, a recess 37 is formed below the tray shaft 31 of the second side-by-side cover 30. The recess 37 forms a space through which an end portion of the second side-by-side cover 30 adjacent to the tray shaft 31 passes when the second side-by-side cover 30 rotates. Therefore, the recess 37 allows the second side-by-side cover 30 to smoothly rotate around the tray shaft 31. Moreover, the recess 37 allows the upper surface of the sheet guide surface 35 to be near the shaft of the second side-by-side cover 30 in the height direction, whereby the height of the sheet cover 25 can be reduced.

As described above, a main part of the sheet transport unit 60 (a transport mechanism for transporting a document sheet) is disposed on the left side of the sheet cover 25. The sheet transport unit 60 successively feeds document sheets placed on the second surface of the second side-by-side cover 30 and the sheet guide surface 35, separates the document sheets into individual document sheets, and transports the document sheet along a predetermined sheet transport path R (see FIG. 4) formed in the main part of the sheet transport unit 60. The multifunction device 1 is capable of reading an image of the document sheet using the scanner unit 20 and the like while the document sheet is transported by the sheet transport unit 60.

The sheet transport path R, which is substantially U-shaped, extends in the left-right direction of the sheet transport unit 60 from the second surface of the second side-by-side cover 30 and the sheet guide surface 35 to the upper surfaces of the partition plates 36A of the sheet guide members 36 (see FIG. 4). In the present embodiment, a direction extending from the upper surface of the sheet guide surface 35 along the sheet transport path R toward the partition plates 36A will be referred to as the transport direction of a document sheet. The width direction of a document sheet that is transported along the sheet transport path R (i.e., the front-rear direction of the sheet transport unit 60) will be referred to as the width direction of the document sheet.

As illustrated in FIGS. 3 and 4, the unit body 40 and the first stacked cover 45 are formed on the left side of the sheet cover 25. As described above, the unit body 40 is a part of the cover housing 26 including the main mechanism of the sheet transport unit 60 (such as a pair of transport rollers 61 and a transport driving roller 62, which will be described below). That is, the unit body 40 is the main part of the sheet transport unit 60. A part of the sheet transport path R is formed in the unit body 40 so as to connect the vicinity of the sheet guide surface 35 to the upper surface of the unit body 40 (see FIG. 4).

The first stacked cover 45 is supported so as to be rotatable around an axis. The axis may be provided by shaft 49. FIG. 4 shows shaft 49 positioned at the left end of the unit body 40, so that the first stacked cover 45 is openable and closable relative to the upper surface of the unit body 40 (see FIGS. 1 to 8). It is appreciated that shaft 49 may be replaced with projections from or extending into first stacked cover 45 such that it is pivotable with respect to scanner 20. The inner surface (lower surface) of the first stacked cover 45 and the upper surface of the unit body 40 cooperatively form a part of the sheet transport path R. Therefore, a part of the sheet transport path R between the upper surface of the unit body 40 and the first stacked cover 45 is connected to a part of the sheet transport path R in the unit body 40, and the sheet transport path R extends toward the partition plates 36A of the sheet guide members 36.

The second stacked cover 70 and a decorative sheet D are removably attached to the upper surface of the first stacked cover 45 (a first top cover attachment surface 46 described below). This will be described below in detail.

As illustrated in FIG. 4, a second top cover attachment surface 50 is formed on the right side of the sheet cover 25. The second top cover attachment surface 50 is a surface that forms the upper surface of the cover housing 26 on the right side of the sheet cover 25 and to which the first side-by-side cover 80 and the decorative sheet D (described below) are removably attached. The structure of the second top cover attachment surface 50 will be described below in detail.

Referring to FIG. 4, the structure of the sheet transport unit 60 of the multifunction device 1 will be described in detail. The sheet transport unit 60 includes the pair of transport rollers 61, the transport driving roller 62, a sheet pressing member 63, and a transport driven roller 64. As described above, the sheet transport unit 60 transports a document sheet along a predetermined sheet transport path R (see FIG. 4).

Figure 7:
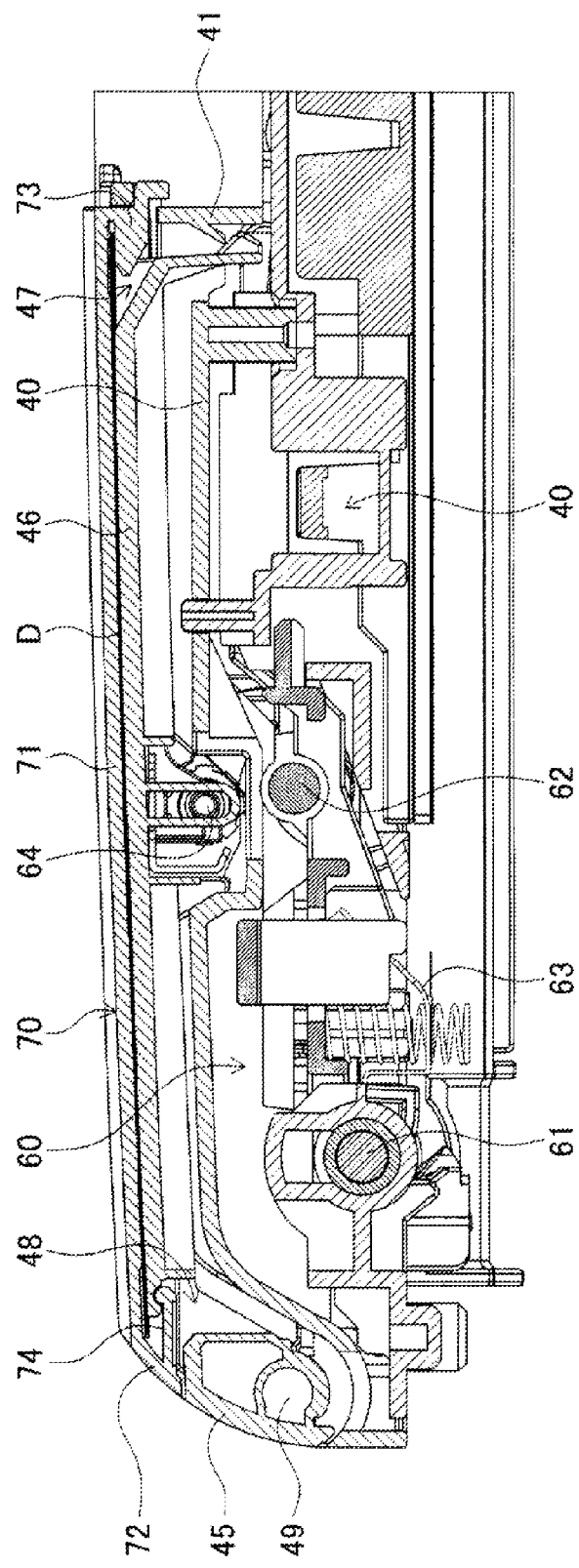
FIG. 7 is a sectional view of the vicinity of the first top cover when the first stacked cover is closed.
Figure 8:
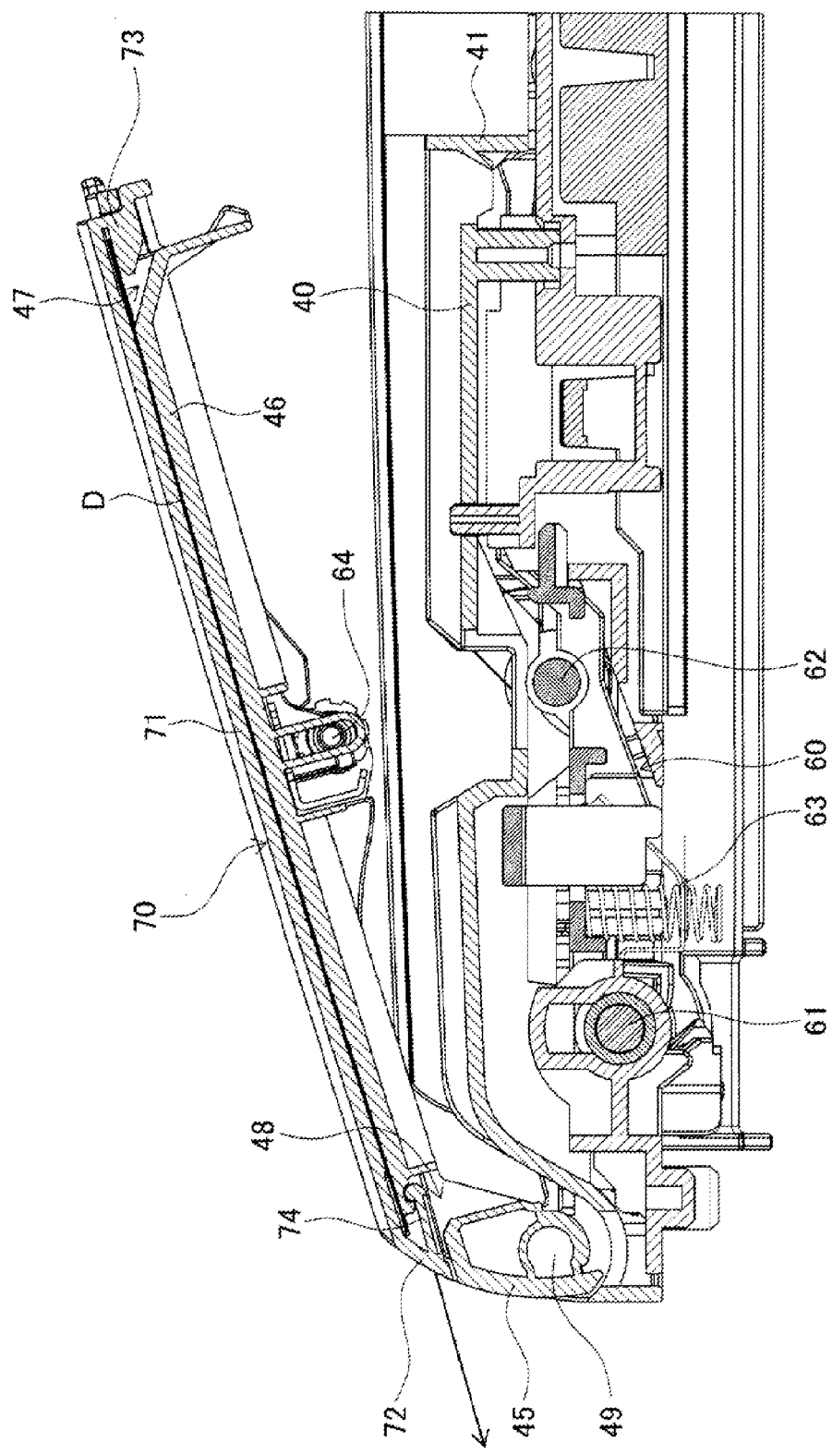
FIG. 8 is a sectional view of the vicinity of the first top cover when the first stacked cover is open.

As illustrated in FIGS. 4, 7, and 8, the pair of transport rollers 61 are disposed so as to face each other with the sheet transport path R therebetween. The pair of transport rollers 61 are controlled by the control unit and rotate while nipping a document sheet, which is located on the sheet transport path R, therebetween. The transport driving roller 62 is pivotably disposed along the upper surface of the unit body 40, and transports a document sheet, which is transported in the sheet transport path R, which extends along the upper surface of the unit body 40, toward the upper surface of the partition plates 36A of the sheet guide members 36.

The sheet pressing member 63 is disposed upstream of the pair of transport rollers 61 in the transport direction, and presses a document sheet on the sheet transport path R against the contact glass 21. In the multifunction device 1, the image sensor 22 is positioned below the sheet pressing member 63 when the sheet transport unit 60 reads an image of a document sheet. Thus, the multifunction device 1 is capable of reading an image of a document sheet through the contact glass 21 by using the image sensor 22 while the document sheet is passing below the sheet pressing member 63. At this time, because the sheet pressing member 63 presses the document sheet against the contact glass 21, the image can be read with a high precision.

The transport driven roller 64 is pivotably supported on the inner surface of the first stacked cover 45. The transport driven roller 64 faces the transport driving roller 62 with the sheet transport path R therebetween when the first stacked cover 45 is closed relative to the upper surface of the unit body 40. Therefore, the transport driven roller 64 and the transport driving roller 62 are capable of cooperatively transporting a document sheet, which is transported along the sheet transport path R, toward the upper surfaces of the partition plates 36A of the sheet guide members 36.

Figure 5:
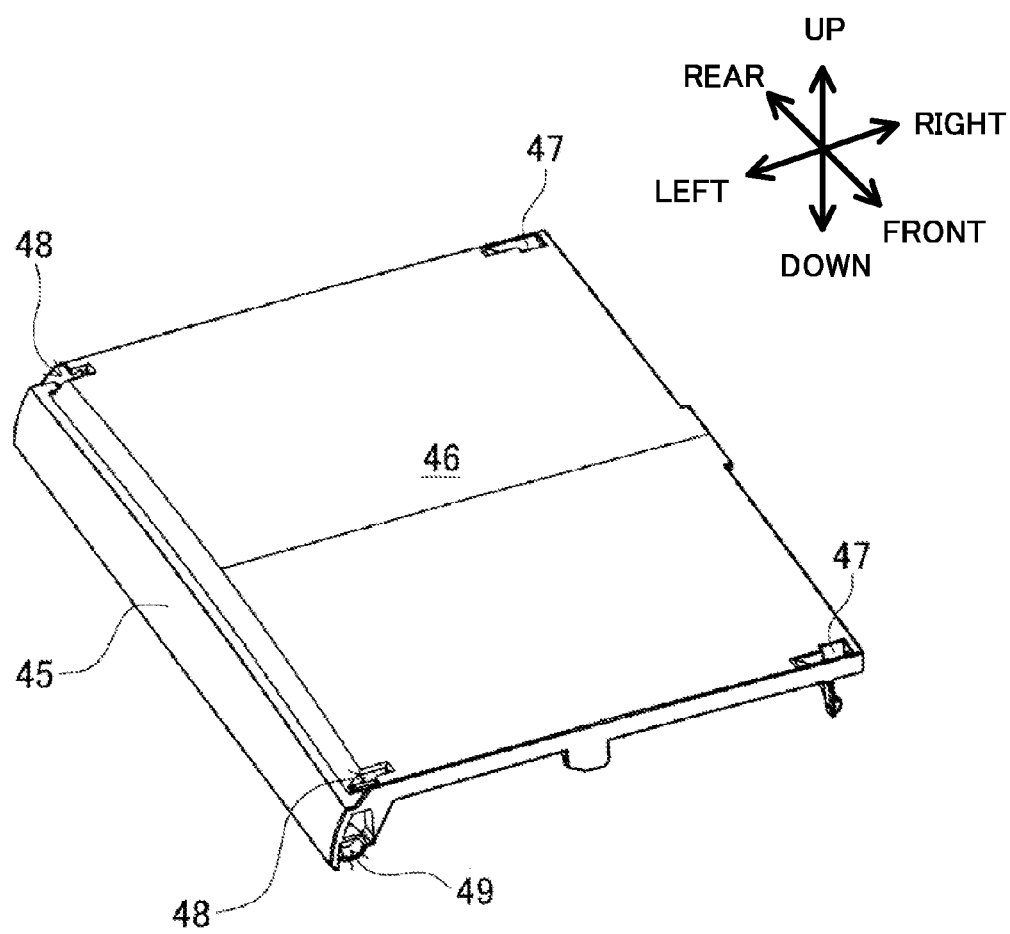
FIG. 5 is an external view of the first stacked cover.
Figure 6:
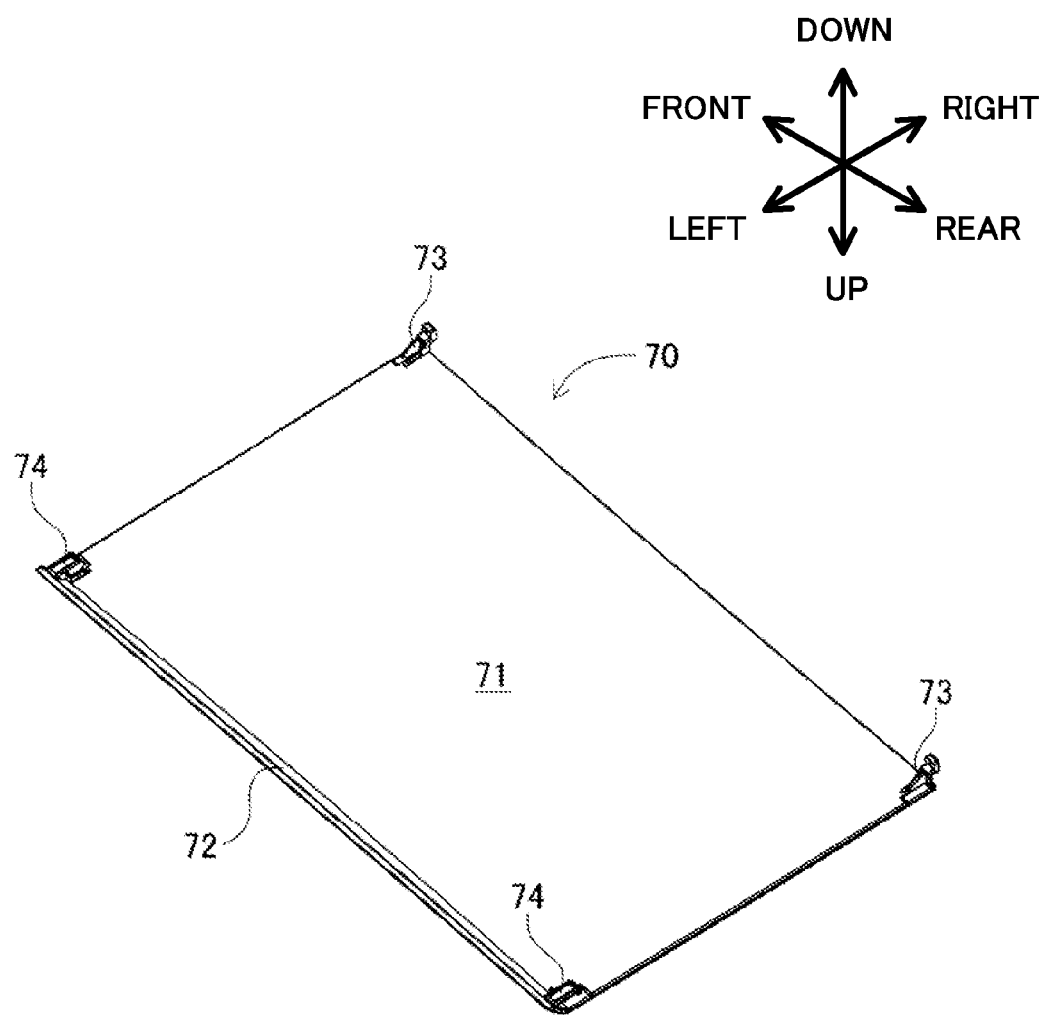
FIG. 6 is an external view of a first top cover.

Next, the structure of the first stacked cover 45 of the multifunction device 1 according to the present embodiment will be described in detail with reference to the drawings. As described above, the first stacked cover 45 is attached to the left side of the sheet cover 25 so as to be openable and closable relative to the unit body 40. As illustrated in FIG. 5, the first stacked cover 45 includes the first top cover attachment surface 46 and the shaft 49. The shaft 49 linearly extends at the left end of the first stacked cover 45 in the front-rear direction, and pivotably supports the first stacked cover 45 so that the first stacked cover 45 can be opened and closed relative to the unit body 40.

The first top cover attachment surface 46 is a flat portion that forms the upper surface of a left side portion of the cover housing 26. First slide holes 47 and first engagement holes 48 are formed in the first top cover attachment surface 46. The second stacked cover 70 (described below) with a decorative sheet D is removably attached to the first top cover attachment surface 46.

The first slide holes 47 are substantially rectangular holes formed in the right-hand corners of the first top cover attachment surface 46. When the second stacked cover 70 is attached to the first top cover attachment surface 46, first protruding pieces 73 (described below) formed on the second stacked cover 70 are slidably inserted into the first slide holes 47 (see FIGS. 7 and 8). The first slide holes 47 each have an inclined surface that extends from the left edge thereof and that is inclined toward to the back surface (a surface facing the unit body 40). When attaching and removing the second stacked cover 70, the first protruding pieces 73 are inserted into the first slide holes 47 while being slid along the inclined surfaces.

First engagement holes 48 are formed in the left-hand corners of the first top cover attachment surface 46. When attaching the second stacked cover 70, the first engagement holes 48 engage with first slide engagement pieces 74, which are formed on the second stacked cover 70 as described below, and removably hold the second stacked cover 70 on the first top cover attachment surface 46 (see FIGS. 7 and 8). Each of the first engagement holes 48, which is formed in the first top cover attachment surface 46, includes an engageable piece formed on a lower surface thereof and a hole portion formed in the lower side thereof. The hole portions are formed so that the first slide engagement pieces 74 can be slid therein in the left-right direction.

Next, the structure of the second stacked cover 70 of the multifunction device 1 according to the present embodiment will be described in detail with reference to the drawings. The second stacked cover 70 is made of a transparent resin, and is removably attached to the upper surface of the first stacked cover 45 (the first top cover attachment surface 46). The second stacked cover 70 includes a flat panel portion 71, a side panel portion 72, the first protruding pieces 73, and the first slide engagement pieces 74. A decorative sheet D having a predetermined pattern can be held between the second stacked cover 70 and the first top cover attachment surface 46.

The flat panel portion 71 has a shape that is substantially the same as that of the first top cover attachment surface 46. The decorative sheet D is held along the flat panel portion 71 by the first protruding pieces 73 and the first slide engagement pieces 74. The side panel portion 72 extends in a left downward direction from the left edge of the flat panel portion 71.

The first protruding pieces 73 protrude downward from the right-hand corners of the flat panel portion 71. When attaching the second stacked cover 70, the first protruding pieces 73 are slid into the first slide holes 47 along long sides of the first slide holes 47. The first protruding pieces 73 and the first slide holes 47, which are formed in the first top cover attachment surface 46, cooperatively serve to removably hold the second stacked cover 70 at a predetermined position of the first top cover attachment surface 46. When the second stacked cover 70 is attached to the first top cover attachment surface 46, the first protruding pieces 73 protrude to predetermined positions that are below the first top cover attachment surface 46 of the first stacked cover 45 (see FIGS. 7 and 8).

The first slide engagement pieces 74 are formed at ends of the side panel portion 72 in the front-back direction. The first slide engagement pieces 74 extend rightward from the side panel portion 72 along the flat panel portion 71. When attaching the second stacked cover 70, the first slide engagement pieces 74 enter the first engagement holes 48 formed in the first stacked cover 45 as the second stacked cover 70 slides. The first slide engagement pieces 74 have projections at end portions of the upper surfaces thereof. When the second stacked cover 70 is moved to a predetermined position, the projections are fitted into the engagement recesses in the engageable pieces of the first engagement holes 48. Therefore, the second stacked cover 70 is removably attached to the first top cover attachment surface 46 using the first slide engagement pieces 74 and the first engagement holes 48.

The first protruding pieces 73 and the first slide engagement pieces 74 respectively have slits that extend along the flat panel portion 71. When edges of the decorative sheet D are inserted into the slits, the slits serve to hold the decorative sheet D along the flat panel portion 71 (see FIGS. 7, 8, etc.). Therefore, the pattern of the decorative sheet D can be seen through the second stacked cover 70, which is made of a transparent resin. The decorative sheet D can be replaced with a decorative sheet having a different pattern by removing the second stacked cover 70 from the first top cover attachment surface 46 of the first stacked cover 45.

Next, an operation of attaching the second stacked cover 70 to the first top cover attachment surface 46 of the first stacked cover 45 and an operation of removing the second stacked cover 70 from the first top cover attachment surface 46 will be described in detail with reference to the drawings. First, a case where the first stacked cover 45 is closed when the second stacked cover 70 is attached to the first top cover attachment surface 46 will be described.

As described above, the first slide holes 47, the first protruding pieces 73, the first engagement holes 48, and the first slide engagement pieces 74 cooperatively serve to removably attach the second stacked cover 70 to the first top cover attachment surface 46. As illustrated in FIGS. 7 and 8, when removing the second stacked cover 70 from the first top cover attachment surface 46, a user slides the second stacked cover 70 toward the shaft 49 (toward the left of the multifunction device 1).

The direction in which the second stacked cover 70 is slid to remove the second stacked cover 70 (a direction toward the left of the multifunction device 1) will be referred to as a "first top cover removal direction" and the opposite direction will be referred to as a "first top cover attachment direction".

The unit body 40 according to the present embodiment includes slide restricting portions 41 at two positions at the right end of the unit body 40. The distance between the shaft 49 and each of the slide restricting portions 41 is slightly smaller than the distance between the shaft 49 and the right end of the first stacked cover 45. Therefore, if the first stacked cover 45 is closed when the second stacked cover 70 is attached to the first top cover attachment surface 46, the first protruding pieces 73 of the second stacked cover 70 are located in the vicinity of the slide restricting portions 41 of the unit body 40 of the first stacked cover 45 in a state in which the first protruding pieces 73 extend through the first slide holes 47. That is, as illustrated in FIG. 7, the slide restricting portions 41 are disposed on the shaft 49 side (on the left side) of the first protruding pieces 73.

The slide restricting portions 41 extend to a height that is slightly smaller than that of the first top cover attachment surface 46. That is, if the first stacked cover 45 is closed when the second stacked cover 70 is attached to the first top cover attachment surface 46, the upper ends of the slide restricting portions 41 are located above the lower ends of the first protruding pieces 73 of the second stacked cover 70 that extend through the first slide holes 47. Therefore, if the second stacked cover 70 is slid in the first top cover removal direction when the second stacked cover 70 is attached to the first top cover attachment surface 46 and the first stacked cover 45 is closed, the first protruding pieces 73 of the second stacked cover 70 contact the right side surfaces of the slide restricting portions 41. That is, the sliding amount of the second stacked cover 70 is restricted by the slide restricting portions 41, so that the second stacked cover 70 is prevented from being moved by an amount that may release the engagement between the first slide engagement pieces 74 and the first engagement holes 48. Thus, when the first stacked cover 45 is closed, a user cannot remove the second stacked cover 70 from the first top cover attachment surface 46 (see FIG. 7).

Next, a case where the first stacked cover 45 is opened when the second stacked cover 70 is attached to the first top cover attachment surface 46 will be described. As illustrated in FIG. 8, when the first stacked cover 45 is opened, the first protruding pieces 73 move upward as the first stacked cover 45 rotates and become separated from the slide restricting portions 41 of the unit body 40. Therefore, when the first stacked cover 45 is opened, the slide restraining portions 41 are not located on a path along which the first protruding pieces 73 move when the second stacked cover 70 is slid in the first top cover removal direction, so that the sliding amount of the second stacked cover 70 is not restricted by the slide restricting portions 41. That is, when the first stacked cover 45 is open, a user can release the engagement between the first slide engagement pieces 74 and the first engagement holes 48 by sliding the second stacked cover 70 in the first top cover removal direction, thereby removing the second stacked cover 70 from the first top cover attachment surface 46.

Thus, in the multifunction device 1 according to the present embodiment, when the first stacked cover 45 is closed and the sheet transport unit 60 is ready to be used, the second stacked cover 70 cannot be removed from the first top cover attachment surface 46 due to the first protruding pieces 73 and the slide restricting portions 41. That is, with the multifunction device 1, the second stacked cover 70 is prevented from being removed when a user unintentionally contacts the second stacked cover 70.

In the multifunction device 1 according to the present embodiment, when the first stacked cover 45 is open, the engagement between the first slide engagement pieces 74 and the first engagement holes 48 can be released by sliding the second stacked cover 70 in the first top cover removal direction. That is, with the multifunction device 1, the second stacked cover 70 can be removed from the first stacked cover 45 by performing simple operations of opening the first stacked cover 45 and sliding the second stacked cover 70 in the first top cover removal direction.

Next, the structure of the first side-by-side cover 80 according to the present embodiment will be described in detail with reference to the drawings. As illustrated in FIGS. 1 to 4, the first side-by-side cover 80, which is made of a transparent resin, forms the right side of the upper surface of the sheet cover 25. The first side-by-side cover 80 is removably attached to the second top cover attachment surface 50. The decorative sheet D having a predetermined pattern can be held between the first side-by-side cover 80 and the second top cover attachment surface 50.

Second slide holes (not shown) are formed at two left-hand corners of the second top cover attachment surface 50. The second slide holes have shapes similar to those of the first slide holes, and second protruding pieces 83 of the first side-by-side cover 80 are inserted into the second slide holes. Second engagement holes (not shown) are formed at two right-hand corners of the second top cover attachment surface 50. The second engagement holes have shapes similar to those of the first engagement holes 48. The second engagement holes and second slide engagement pieces 84 of the first side-by-side cover 80 cooperatively serve to removably attach the first side-by-side cover 80 to the second top cover attachment surface 50.

Figure 9:
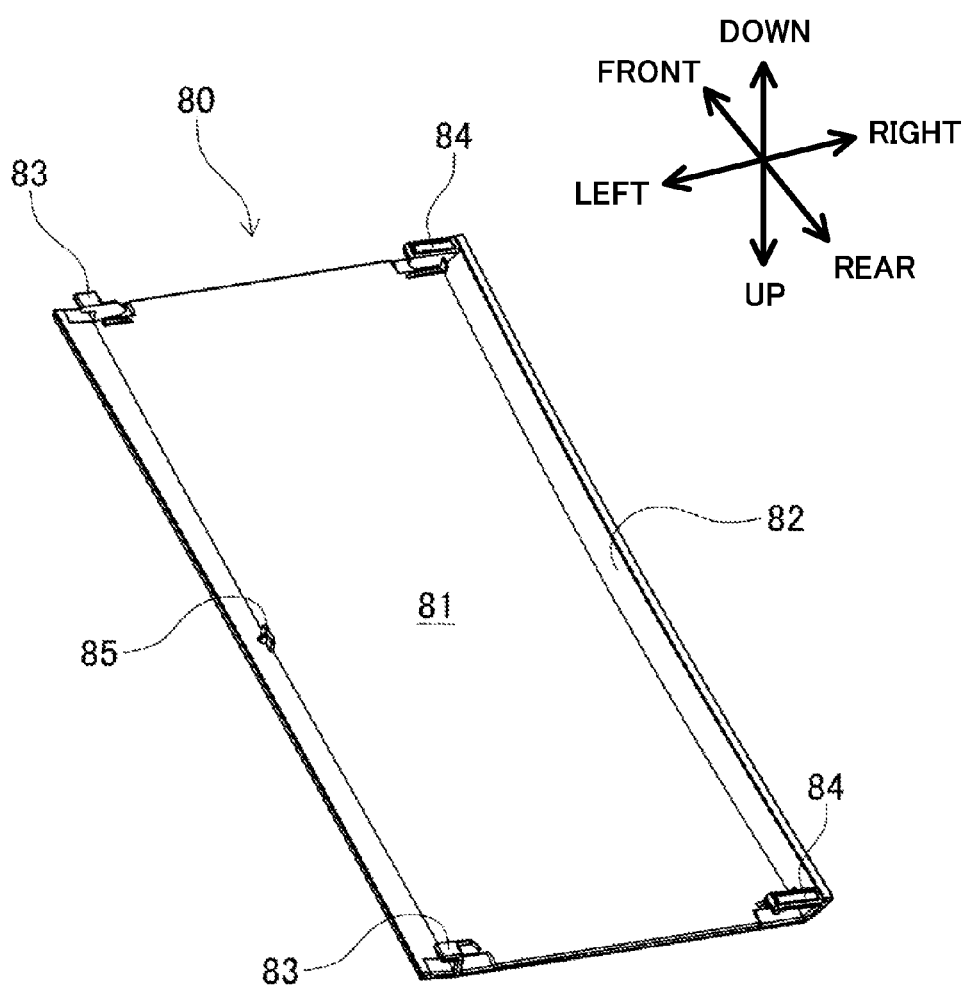
FIG. 9 is an external view of a second top cover.

As illustrated in FIG. 9, the first side-by-side cover 80 includes a flat panel portion 81, a side panel portion 82, the second protruding pieces 83, the second slide engagement pieces 84, and a lock piece 85. The flat panel portion 81 has substantially the same shape as the second top cover attachment surface 50. The decorative sheet D is held by the second protruding pieces 83 and the second slide engagement pieces 84 so as to extend along the flat panel portion 81. The side panel portion 82 extends in the right downward direction from the right edge of the flat panel portion 81.

The second protruding pieces 83 extend downward from the left-hand corners of the flat panel portion 81, and have shapes substantially the same as the first protruding pieces 73.

When attaching the first side-by-side cover 80, the second protruding pieces 83 are slid into the second slide holes.

The second slide engagement pieces 84 are formed at ends of the side panel portion 82 in the front-rear direction and extend leftward from the side panel portion 82 along the flat panel portion 71. When attaching the first side-by-side cover 80, the second slide engagement pieces 84 enter the second engagement holes formed in the second top cover attachment surface 50 as the first side-by-side cover 80 slides. Therefore, the first side-by-side cover 80 is removably attached to the second top cover attachment surface 50 using the second slide engagement pieces 84 and the second engagement holes.

A direction in which the first side-by-side cover 80 is slid when removing the first side-by-side cover 80 (toward the right of the multifunction device 1) will be referred to as a second top cover removal direction, and the opposite direction will be referred to as a second top cover attachment direction.

Each of the second protruding pieces 83 and the second slide engagement pieces 84 has a slit extending along the flat panel portion 81. When edges of the decorative sheet D are inserted into the slits, the second protruding pieces 83 and the second slide engagement pieces 84 serve to hold the decorative sheet D along the flat panel portion 81 (see FIGS. 10 and 11). Therefore, the pattern of the decorative sheet D can be seen through the first side-by-side cover 80, which is made of a transparent resin. The decorative sheet D can be replaced with a decorative sheet having a different pattern by removing the first side-by-side cover 80 from the second top cover attachment surface 50.

The lock piece 85 protrudes from a surface opposite the second top cover attachment surface 50 in a middle portion of the left edge of the first side-by-side cover 80 in the front-rear direction. The lock piece 85 and a slide restricting member 51, which is formed on the second top cover attachment surface 50, cooperatively restrain the first side-by-side cover 80 from being slid in the second top cover removal direction.

Figure 10:
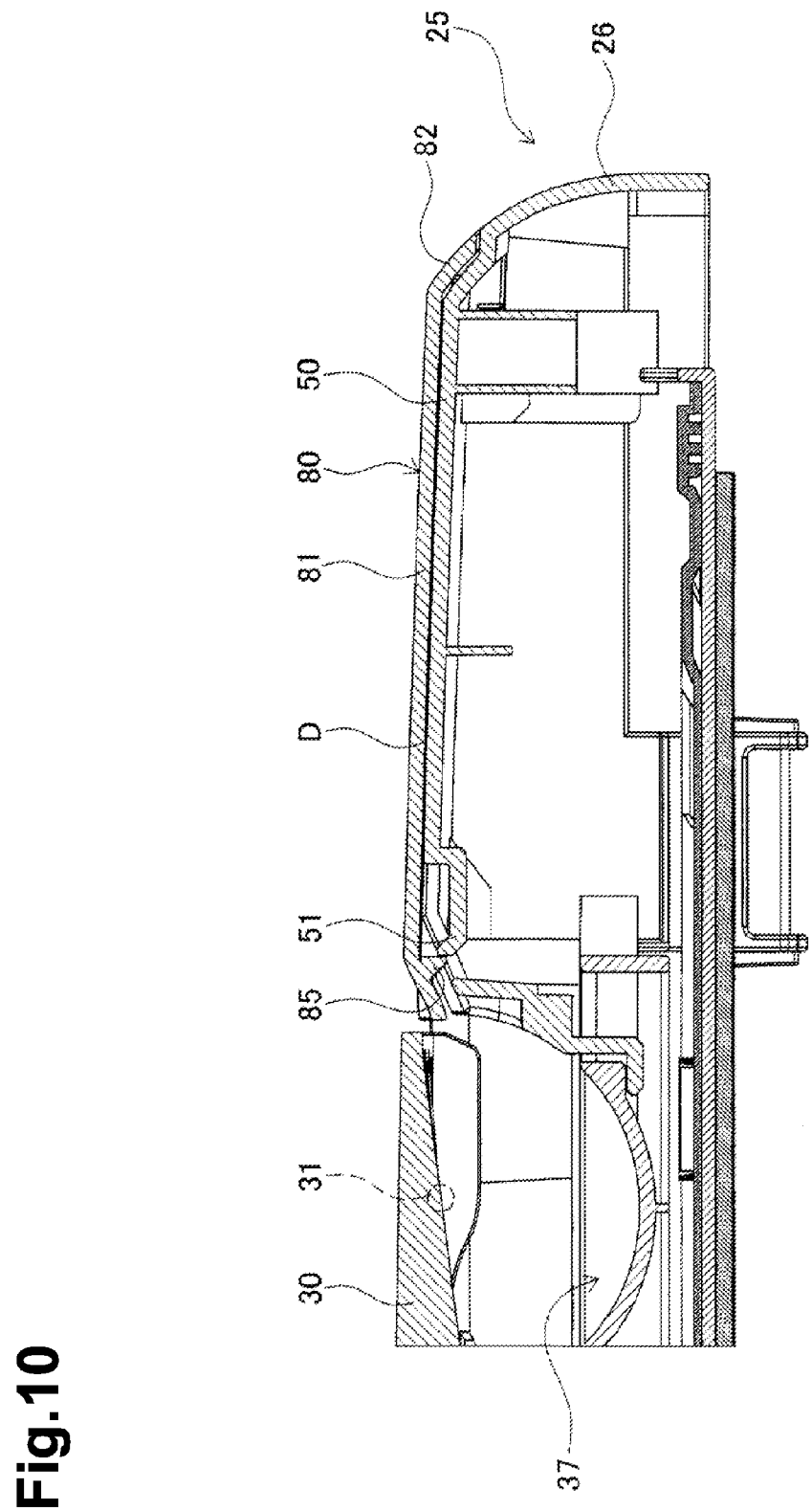
FIG. 10 is a sectional view of the vicinity of the second top cover when the cover tray is at the closed position.
Figure 11:
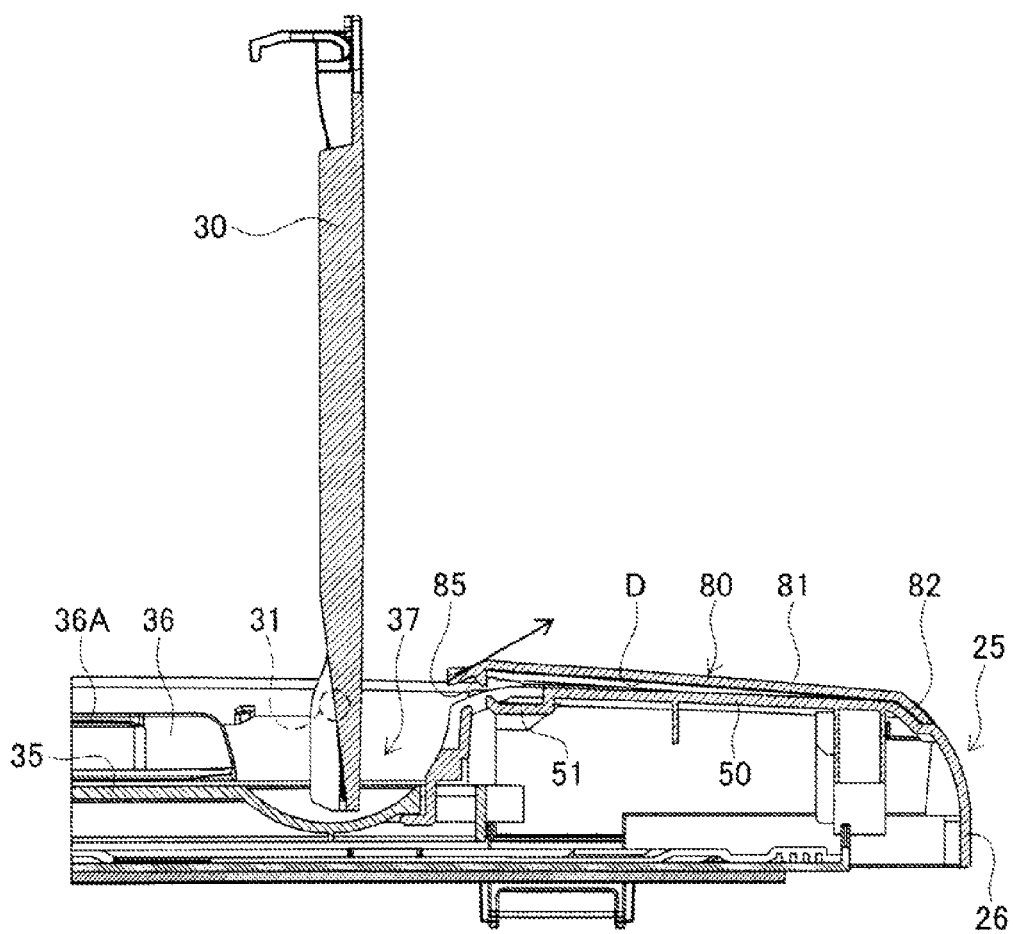
FIG. 11 is a sectional view of the vicinity of the second top cover when the cover tray is at the open position.

The slide restricting member 51 includes a recessed portion and a lug portion (see FIGS. 10 and 11). The recessed portion is formed in a middle part of the left edge of the second top cover attachment surface 50 and is recessed downward. The lug portion protrudes upward along the right edge of the recess. When the first side-by-side cover 80 is attached the second top cover attachment surface 50, the slide restricting member 51 is positioned downstream of the lock piece 85 of the first side-by-side cover 80 in the second top cover removal direction. At this time, an end of the slide restricting member 51 (the left end in FIGS. 10 and 11) contacts a side surface on the downstream side of the lock piece 85 in the second top cover removal direction. Therefore, in the multifunction device 1, the first side-by-side cover 80 cannot be removed from the second top cover attachment surface 50 by simply sliding the first side-by-side cover 80 in the second top cover removal direction, because the sliding amount of the first side-by-side cover 80 is restricted.

Next, operations of attaching the first side-by-side cover 80 to the second top cover attachment surface 50 and removing the first side-by-side cover 80 from the second top cover attachment surface 50 will be described in detail with reference to the drawings. As illustrated in FIG. 10, to remove the first side-by-side cover 80, it is necessary to separate the lock piece 85 of the first side-by-side cover 80 from the slide restricting member 51 of the second top cover attachment surface 50 and enable the first side-by-side cover 80 to be moved in the second top cover removal direction. Therefore, a user has to lift the left edge of the first side-by-side cover 80 (which is adjacent to the second side-by-side cover 30).

As illustrated in FIG. 1 and other figures, the second side-by-side cover 30 is disposed adjacent to the left side of the first side-by-side cover 80. Therefore, when the second side-by-side cover 30 is at the closed position (see FIGS. 1 and 10), a user cannot lift the left edge of the first side-by-side cover 80 from below. That is, when the second side-by-side cover 30 is at the closed position, the lock piece 85 and the slide restraining lug 51 cooperatively restrict in the first side-by-side cover 80 from being moved in the second top cover removal direction (see FIG. 10). Therefore, with the multifunction device 1, even if a user unintentionally contacts the first side-by-side cover 80, the first side-by-side cover 80 is prevented from being removed from the second top cover attachment surface 50.

As described above, the second side-by-side cover 30 is rotatable around the tray shaft 31. When the second side-by-side cover 30 is rotated by a predetermined amount to a predetermined position (for example, see FIGS. 2 and 11), the recess 37 is connected to the outside of the sheet cover 25. That is, when the second side-by-side cover 30 is at the predetermined position, a user can hook his/her finger on the left edge of the lower surface of the first side-by-side cover 80 from the outside of the sheet cover 25 and lift the first side-by-side cover 80.

When the left edge of the first side-by-side cover 80 is lifted, the lock piece 85 of the first side-by-side cover 80 is located above the slide restricting member 51 of the second top cover attachment surface 50. The lock piece 85 is disposed in the middle portion of the left edge of the first side-by-side cover 80, at which the first side-by-side cover 80 is maximally deflected when the first side-by-side cover 80 is lifted by a user. Therefore, the user can move the lock piece 85 to a position above the slide restricting member 51 without applying a large force. In this state, the slide restricting member 51 is not present on the downstream side of the lock piece 85 in the second top cover removal direction, so that the user can remove the first side-by-side cover 80 from the second top cover attachment surface 50 by sliding the first side-by-side cover 80 in the second top cover removal direction.

Thus, in the multifunction device 1 according to the present embodiment, the lock piece 85 and the slide restricting member 51 cooperatively serve to restrict the first side-by-side cover 80 from being slid in the second top cover removal direction. Therefore, with the multifunction device 1, even if a user unintentionally contacts the first side-by-side cover 80, the first side-by-side cover 80 is prevented from being removed from the second top cover attachment surface 50.

In the multifunction device 1 according to the present embodiment, it is necessary to lift the left edge of the first side-by-side cover 80 to enable the first side-by-side cover 80 to be slid in the second top cover removal direction. When the first side-by-side cover 80 is lifted, the first side-by-side cover 80 is allowed to be slid in the second top cover removal direction. Therefore, a user can release the engagement between the second slide engagement pieces 84 and the second engagement holes and remove the first side-by-side cover 80 from the second top cover attachment surface 50 by sliding the first side-by-side cover 80 in the second top cover removal direction.

To lift the left edge of the first side-by-side cover 80, it is necessary to apply an upward force to the left edge of the first side-by-side cover 80 from below. Therefore, it is necessary to rotate the second side-by-side cover 30 by a predetermined amount to connect the recess 37, which is adjacent to the left edge of the first side-by-side cover 80, to the outside of the sheet cover 25 so that a user can contact the lower surface of the left edge of the lower surface of the first side-by-side cover 80 with his/her finger. That is, with the multifunction device 1, the user can remove the first side-by-side cover 80 from the second top cover attachment surface 50 by performing simple operations of rotating the second side-by-side cover 30 by a predetermined amount and of lifting the left edge of the first side-by-side cover 80 and sliding the first side-by-side cover 80 in the second top cover removal direction.

Heretofore, an embodiment of the present invention has been described. However, the present invention is not limited to the embodiment described above, and can be modified within the sprit and scope of the present invention. For example, in the embodiment described above, the multifunction device 1 having the functions of a scanner, a copier, a printer, and a facsimile is used as an example. However, the present invention is not limited thereto. As long as an apparatus has the function of an auto document feeder (ADF), other functions are optional.

In the embodiment described above, the appearance of the multifunction device 1 is customized by using a transparent resin as the material of the second stacked cover 70 and the first side-by-side cover 80 and thereby making the pattern of the decorative sheet D visible through the second stacked cover 70 and the first side-by-side cover 80. However, the present invention is not limited thereto. That is, the material of the second stacked cover 70 and the first side-by-side cover 80 need not be a transparent resin, and the second stacked cover 70 and the first side-by-side cover 80 may have patterns thereon.

In the embodiment described above, the multifunction device 1 has an attachment mechanism for the second stacked cover 70 and an attachment mechanism for the first side-by-side cover 80. However, the multifunction device 1 may have only one of the attachment mechanisms.

What is claimed is:

1. A sheet transport apparatus comprising:
a main body including a transport mechanism that transports a sheet along a predetermined transport path; a first stacked cover that is pivotably supported so as to be openable and closable relative to the main body; and
a second stacked cover that is removably attached to an outer surface of the first stacked cover, wherein the second stacked cover is removably attached to the outer surface of the first stacked cover by being configured to be slid relative to the first stacked cover, and
wherein the second stacked cover is configured to be slid relative to the first stacked cover when the first stacked cover is opened relative to the main body and the second stacked cover is configured to be restricted from being removed relative to the first stacked cover when the first stacked cover is closed relative to the main body.

2. The sheet transport apparatus according to claim 1, wherein, when the first stacked cover is closed relative to the main body, a length of slide of the second stacked cover relative to the first stacked cover is restricted.

3. The sheet transport apparatus according to claim 1, wherein the second stacked cover includes a first protruding piece that protrudes from the second stacked cover below the first stacked cover, and
wherein the main body includes a first restricting portion, the first restricting portion including a first restricting portion contact surface configured to restrict movement of the second stacked cover through contact between the first restricting portion contact surface and the first protruding piece.

4. The sheet transport apparatus according to claim 1,
wherein the second stacked cover is configured to be removed from the first stacked cover when slid in a slide direction,
wherein the second stacked cover includes a first protruding piece that protrudes from the second stacked cover, the first protruding piece including a first contact surface, and
wherein the main body includes a first restricting portion, the first restricting portion including a first restricting portion contact surface located downstream of the first protruding piece in the slide direction, the first restricting portion configured to restrict sliding movement of the second stacked cover by contacting the first protruding piece, and
wherein the first stacked cover is configured to permit the first protruding piece to be located below the first stacked cover contact surface while the second stacked cover is positioned on top of the first stacked cover.

5. The sheet transport apparatus according to claim 1,
wherein the first stacked cover is configured to pivot about a stacked cover axis,
wherein the second stacked cover includes a first protruding piece that protrudes from the second stacked cover at a predetermined position, and
wherein the main body includes a first restricting portion located at a position that is spaced apart from the stacked cover axis by a distance that corresponds to a distance between the first protruding piece and the stacked cover axis when the second stacked cover is attached to the first stacked cover,
wherein the first stacked cover has a slide hole formed therein, the slide hole allowing the first protruding piece to be slidably inserted thereinto while the second stacked cover is being attached,
wherein the first restricting portion includes a contact surface positioned on an upstream side in a direction in which the second stacked cover is slidingly removed, the contact surface being capable of contacting the first protruding piece when the second stacked cover is attached to the first stacked cover,
wherein, when the first stacked cover is opened relative to the main body, the first protruding piece is separated from the contact surface of the first restricting portion and allows the second stacked cover to be slid relative to the first stacked cover, and
wherein, when the first stacked cover is closed relative to the main body, the first protruding piece contacts the contact surface of the first restricting portion and restricts a length of slide of the second stacked cover relative to the first stacked cover.

6. The sheet transport apparatus according to claim 1, further comprising:
a first side-by-side cover that is removably attached to a part of the main body, the first side-by-side cover configured to be slid by a predetermined amount relative to the main body; and
a second side-by-side cover that is pivotably attached to the main body such that at a first position the second side-by-side cover forms a part of an upper surface of the sheet transport apparatus that is adjacent to the first side-by-side cover, the second side-by-side cover including:
an edge closest to the first side-by-side cover when the second side-by-side cover is in the first position; and
wherein the first side-by-side cover is restricted from being moved relative to the main body when the second side-by-side cover is at the first position and the first side-by-side cover is configured to be movable when the second side-by-side cover is pivoted away from the first position,
wherein the second side-by-side cover is configured to be pivotable relative to the main body so that the edge of the second side-by-side cover is movable in a direction away from the first side-by-side cover when the second side-by-side cover pivots away from the first position.

7. The sheet transport apparatus according to claim 6,
wherein, when in the first position, the second side-by-side cover separates a space above the first side-by-side cover from a space below the first side-by-side cover and, when pivoted away from the first position, the second side-by-side cover permits the space above the first side-by-side cover to be connected with the space below the first side-by-side cover.

8. The sheet transport apparatus according to claim 1,
wherein the first stacked cover includes a surface that faces the main body and that forms part of the transport path.

9. The sheet transport apparatus according to claim 1,
wherein the second stacked cover is made of a synthetic resin.

10. The sheet transport apparatus according to claim 1,
wherein the second stacked cover is transparent, and
wherein the sheet transport apparatus is configured to accommodate a decorative sheet between the first stacked cover and the second stacked cover.

11. A sheet transport apparatus comprising:
a main body comprising a transport mechanism that transports a sheet along a predetermined transport path;
a first side-by-side cover that is removably attached to the main body, the first side-by-side cover configured to be slid by a predetermined amount relative to the main body; and
a second side-by-side cover that is pivotably attached to the main body such that at a first position the second side-by-side cover forms a part of an upper surface of the sheet transport apparatus that is adjacent to the first side-by-side cover, the second side-by-side cover including:
an edge closest to the first side-by-side cover when the second side-by-side cover is in the first position; and
wherein the first side-by-side cover is configured to be restricted from being moved relative to the main body when the second side-by-side cover is at the first position and the first side-by-side cover is configured to be movable when the second side-by-side cover is pivoted away from the first position,
wherein the second side-by-side cover is configured to be pivotable relative to the main body so that the edge of the second side-by-side cover is movable in a direction away from the first side-by-side cover when the second side-by-side cover pivots away from the first position.

12. The sheet transport apparatus according to claim 11,
wherein, when in the first position, the second side-by-side cover separates a space above the first side-by-side cover from a space below the first side-by-side cover and, when pivoted away from the first position, the second side-by-side cover permits the space above the first side-by-side cover to be connected with the space below the first side-by-side cover.

13. The sheet transport apparatus according to claim 11,
wherein the first side-by-side cover includes a protruding piece that protrudes toward the main body from an edge portion of the first side-by-side cover closer to the second side-by-side cover than another edge portion of the first side-by-side cover spaced apart from the second side-by-side cover, and wherein the main body includes a restricting portion provided on an edge portion of the main body at a position downstream of the protruding piece in a direction in which the first side-by-side cover is slidingly removed when the first side-by-side cover is attached to the main body, wherein the protruding piece restricts the first side-by-side cover from being slid relative to the main body by contacting the restricting portion, the restricting portion being provided downstream of the protruding piece in a direction in which the first side-by-side cover is slidingly removed, and wherein, when the first side-by-side cover that is attached to the main body is moved upward by a predetermined amount, the first side-by-side cover is allowed to be slid relative to the main body without being restricted by the protruding piece and the restricting portion.

14. The sheet transport apparatus according to claim 11, wherein the first side-by-side cover is made of a synthetic resin, and wherein the first side-by-side cover includes a protruding piece that is disposed in an edge portion of the first side-by-side cover at a position corresponding to a middle part of the first side-by-side cover in a direction perpendicular to a direction in which the first side-by-side cover is slid.

15. The sheet transport apparatus according to claim 11, wherein, when the second side-by-side cover is at the first position, the second side-by-side cover encloses a space that is part of the transport path, wherein the second side-by-side cover pivots about a side-by-side cover axis, and wherein, when the second side-by-side cover is at a second position at which the second side-by-side cover pivots by a predetermined amount around the side-by-side cover axis, the space forming part of the transport path is opened, and the second side-by-side cover is configured to function as a sheet tray that is capable of holding a plurality of sheets thereon and that is inclined toward the transport path.

16. The sheet transport apparatus according to claim 11, wherein the first side-by-side cover is made of a synthetic resin.

17. The sheet transport apparatus according to claim 11, wherein the first side-by-side cover is transparent, and wherein the sheet transport apparatus is configured to accommodate a decorative sheet between the first side-by-side cover and the main body.

18. The sheet transport apparatus according to claim 15, wherein the side-by-side cover axis is a shaft attached to the second side-by-side cover.

19. A sheet transport apparatus comprising:

a main body including a transport path;

first and second stacked covers disposed on a first side of the transport path relative to the main body, the first and second stacked covers configured to be removable from each other via interaction with a first engagement mechanism; and first and second side-by-side covers disposed on a second side of the transport path relative to the main body, one of the first and second side-by-side covers configured to be removable from the main body via interaction with a second engagement mechanism;

wherein the interaction with the first engagement mechanism is different from the interaction with the second engagement mechanism.

20. The sheet transport apparatus according to claim 19, wherein one of the first and second stacked covers is configured to form part of an upper surface of the sheet transport apparatus, wherein both of the first side-by-side cover and the second side-by-side cover form another part of the upper surface of the sheet transport apparatus, and wherein the other of the first and second side-by-side covers is configured to be pivotable relative to the main body.

* * * * *